United States Patent
Hirai et al.

(10) Patent No.: US 7,312,270 B2
(45) Date of Patent: Dec. 25, 2007

(54) FUEL CELL HOSE

(75) Inventors: Ryo Hirai, Komaki (JP); Ayumu Ikemoto, Komaki (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 358 days.

(21) Appl. No.: 10/899,019

(22) Filed: Jul. 27, 2004

(65) Prior Publication Data

US 2005/0026023 A1   Feb. 3, 2005

(30) Foreign Application Priority Data

Jul. 28, 2003   (JP)   ............................. 2003-281267

(51) Int. Cl.
*C08K 3/04*   (2006.01)
*C08K 3/36*   (2006.01)

(52) U.S. Cl. ...................... 524/492; 524/570; 524/576; 524/581; 428/36.8; 428/36.9

(58) Field of Classification Search ................ 524/492, 524/570, 576, 581; 428/36.8, 36.9
See application file for complete search history.

(56) References Cited

U.S. PATENT DOCUMENTS

| | | | |
|---|---|---|---|
| 5,080,942 A | 1/1992 | Yau | |
| 5,278,204 A * | 1/1994 | Tojo et al. | 525/212 |
| 5,279,874 A | 1/1994 | Ichikawa et al. | 428/36.8 |
| 6,071,582 A | 6/2000 | Tangiku et al. | 428/36.91 |
| 6,606,852 B1 * | 8/2003 | Harvey et al. | 60/255 |
| 2002/0022693 A1 * | 2/2002 | Luginsland | 525/100 |

FOREIGN PATENT DOCUMENTS

| | | |
|---|---|---|
| CH | 664231 | 2/1988 |
| EP | 1291556 A2 | 3/2003 |
| GB | 1113327 | 5/1968 |
| JP | 10-180941 | 7/1998 |
| JP | 2003-74759 | 3/2003 |

OTHER PUBLICATIONS

European Search Report dated Oct. 21, 2004, EP 04254521.

* cited by examiner

*Primary Examiner*—Roberto Rabago
(74) *Attorney, Agent, or Firm*—Kratz, Quintos & Hanson, LLP

(57) ABSTRACT

A hose material for a fuel cell which is superior in both of low extraction property and electrical isolation, and which also has excellent mechanical properties, and also a hose manufactured using the hose material. The hose material comprises:
(A) an ethylene-propylene copolymer;
(B) hydrophobic silica;
(C) a peroxide crosslinking agent; and
(D) carbon black.

4 Claims, No Drawings

FUEL CELL HOSE

BACKGROUND OF THE INVENTION

1. Field of the Invention

The present invention relates to a hose material for a fuel cell and also to a hose manufactured by using the same hose material.

2. Description of the Art

It is generally understood that fuel cell systems, especially systems of polymer electrolyte fuel cells (PEFC), will be widely accepted as future power generation systems. It is said that a part for generating electricity of a fuel cell system is vulnerable to foreign matter such as sulfur, metal ions or the like. Therefore, performance of the part is drastically deteriorated if such foreign matter enters the part. For this reason, the hose material or the tube material used in fuel cell systems should have a low extraction property. In other words, the material should be difficult to be extracted by water flowing through a hose or a tube and thus has a high standard of cleanliness. Further, when fuel cell systems are used especially for vehicles, how to cool a great amount of heat generated thereby remains one of the important issues. Thus, it is thought that the role taken by the cooling system is significantly important. When electrical conductivity of the coolant such as LLC (Long Life Coolant) increases in a fuel cell system, an electrical short-circuiting tends to occur. Therefore, it is required to maintain the insulation property of internal fluid (water or LLC). In other words, a hose material or a tube material for use in a fuel cell system (especially, in the cooling system) is required to suppress ion extraction so as not to increase the electrical conductivity of the fluid.

Heretofore, under such circumstances, a SUS tube has been used because of low ion dissolution, or, alternatively, a complicated cooling system has been used, for example, by installing deionization means in the fuel cell system. However, when using a SUS tube, it is difficult to mold or install the SUS tube, which causes problems in terms of layout and processability. In addition, a problem of poor vibration durability with SUS tubes is also caused. Further, when using a tube material with a low extraction property (a high standard of cleanliness), it makes it possible to prolong the interval between regenerating the resin, activated carbon or the like in the deionization means required for a fuel cell system used in a fuel cell electrical vehicle (FCEV) or the like.

Further, the material of a tube connected with the fuel cell itself or accumulator battery (secondary battery) requires the property of electrical insulation (high electrical resistance) to help prevent electric shock due to stray current or current leakage. Alternatively, the materials of peripheral parts of the fuel cell system need to absorb sound or vibration because a fuel cell system is to be quiet compared with an internal combustion system and noise cancelled by the internal combustion system becomes obvious in a fuel cell system.

Accordingly, it has been expected that an elastomer material (a material having rubber elasticity) which is superior in low extraction property, electrical insulation (high electrical resistance) and vibration resistance for absorbing sound and vibration could be utilized as a hose material or a tube material for use in fuel cell systems.

As such a hose material for use in a fuel cell system, a mixture of an ethylene-propylene-diene terpolymer (EPDM) and carbon black has been conventionally used (for example, see Japanese Unexamined Patent Publication No. 10-180941). However, when forming a hose for a fuel cell system by using such a material, the thus obtained hose tends to have low mechanical properties and also have poor electrical insulation. In this case, the amount of carbon black mixed with the EPDM is increased to be highly filled so as to improve reinforcement characteristics.

However, when carbon black is highly-filled into EPDM as mentioned above, each particle of carbon black gets closer to adjacent particles, which further reduces electrical resistance and increases electrical conductivity of the material, which thereby results in a remarkable inferiority in electrical insulation. Further, in this case, elongation of the hose deteriorates and the scorching property is aggravated.

Instead of highly-filling the carbon black to improve reinforcement characteristics, it was thought that perhaps carbon black may be used together with another filler such as silica, talc or clay. Although such a material has excellent electrical insulation, it has remarkably inferior low extraction property. This is because the above-mentioned filler has high polarity to EPDM so that affinity increases between the material and water, which has high polarity. As a result, an element such as silica (Si element or the like) and an ion tend to easily dissolve, because they unstably exist in EPDM. Further, since the above-mentioned filler does not have good dispersibility in EPDM, which is hydrophobic, it may tend to aggravate mechanical properties. Additionally, it has been thought that perhaps silane coupling agent may be further added thereto as a compound for stabilizing silica and the like contained in EPDM, as mentioned above. However, in this case, processability during molding deteriorates (or molded surface becomes rough) and the cost increases.

Thus, it is the current situation that a material satisfying both low extraction property and electrical insulation, and having good processability and superior mechanical properties is still not available. However, such a material is strongly desired.

In view of the foregoing, it is an object of the present invention to provide a hose material for a fuel cell which satisfies both low extraction property and electrical insulation, and is also superior in mechanical properties, and also to provide a hose manufactured by using the same hose material.

SUMMARY OF THE INVENTION

In accordance with a first aspect of the present invention to achieve the aforesaid objects, there is provided a hose material for a fuel cell comprising:

(A) an ethylene-propylene copolymer;
(B) hydrophobic silica;
(C) a peroxide crosslinking agent; and
(D) carbon black.

In accordance with a second aspect of the present invention to achieve the aforesaid objects, there is provided a hose for a fuel cell formed by the same hose material.

The inventors of the present invention conducted intensive studies to provide a hose for a fuel cell to solve the above-mentioned problems by focusing upon a hose material for a fuel cell. During the course of their studies, the inventors focused their attention on peroxide crosslinking of an ethylene-propylene copolymer to impart a low-extraction property and also on the combined use of carbon black and silica as a reinforcing material. Further, to suppress Si element extraction of such a material, which may tend to occur when silica is mixed into an ethylene-propylene copolymer, they further continued their studies by focusing upon silica. It was found that hydrophobic silica substantially does not absorb water, differently from usual silica, and its affinity with an ethylene-propylene copolymer such as EPDM, which is hydrophobic, is improved so as to improve dispersibility in the copolymer. As a result, they found such a hose material for a fuel cell which is superior both in low extraction property and electrical insulation, and which further has superior mechanical properties, and thereby they achieved the present invention.

The inventive hose material for a fuel cell includes, as indispensable components, (A) an ethylene-propylene copolymer; (B) hydrophobic silica; (C) a peroxide crosslinking agent; and (D) carbon black. Especially, since the inventive hose material includes the hydrophobic silica, water-shedding is improved on the surface of the material, and the then obtained hose for a fuel cell is superior both in low extraction property and electrical insulation, and further has superior mechanical properties. Further, since the inventive hose material does not include a silane coupling agent, processability is good in molding. Still further, since the hose manufactured by using the inventive hose material suppresses ion dissolution, which may increase conductivity of fluid, short-circuiting of a fuel cell system can effectively be prevented. When manufacturing a hose for fuel cell by using the inventive hose material, even a single-layer hose has sufficient strength, so that simplicity of the manufacturing process can be realized.

When the mixing proportion of the hydrophobic silica is within a specific range, low extraction property and electrical insulation are further improved with an effect for reinforcing the hose.

When the mixing proportion of the carbon black is within a specific low range, electrical insulation is further improved while maintaining an effect for reinforcing the hose.

DESCRIPTION OF THE PREFERRED EMBODIMENTS

Embodiments of the present invention will hereinafter be described in detail.

An inventive hose material for a fuel cell may be obtained by using an ethylene-propylene copolymer (component A); hydrophobic silica (component B); a peroxide crosslinking agent (component C); and carbon black (component D). The hydrophobic silica herein means such silica as obtained by treating silica microparticles with a hydrophobic treatment agent, that is, for example, by replacing a silanol group (SiOH) on surfaces of the silica microparticles with, for example, an methyl group, so as to impart a, hydrophobic property.

Examples of the ethylene-propylene copolymer (component A) include, for example, an ethylene-propylene-diene terpolymer (EPDM) and an ethylene-propylene copolymer (EPM), which may be used either alone or in combination. The ethylene-propylene copolymer (component A) is not specifically limited, but the iodine value is preferably within a range of 6 to 30, particularly preferably 10 to 24, and the ethylene ratio is preferably within a range of 48% to 70% by weight, particularly preferably 50% to 60% by weight. Such a polymer is superior in stability at high temperatures and high pressures.

The diene monomer (third component) of EPDM is not particularly limited, but preferably is a diene monomer having 5 to 20 carbon atoms. Examples thereof include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene and 2-isopropenyl-5-norbornene. Among these diene monomers (third component), dicyclopentadiene (DCP) and 5-ethylidene-2-norbornene (ENB) are particularly preferred.

As mentioned above, the hydrophobic silica (component B) used along with the above-mentioned component A can be obtained by treating silica microparticles with a hydrophobic treatment agent. Such a treatment process is conducted, for example, by placing silica microparticles into a Henschel mixer and agitating thereof with a specific treatment at not more than 150° C. for a few minutes. Generally, the average diameter of the silica microparticles is preferably within a range of 1 to 50 μm, more preferably within a range of 2 to 20 μm.

The silica microparticles used as a material for the hydrophobic silica are not specifically limited. For example, the shape thereof is not limited to a sphere and may be an ellipse or the like. Further, the silica microparticles may be a small agglomeration comprised of multiple microparticles.

Examples of the hydrophobic treatment agent may include an organohalosilane such as dimethyldichlorosilane, methyltrichlorosilane, dimethyldibromosilane, methyltribromosilane, diethyldichlorosilane, ethyltrichlorosilane, dipropyldichlorosilane, diisopropyldichlorosilane, propyltrichlorosilane, dibuthyldichlorosilane and butyltrichlorosilane; an organosilane such as trimethoxy-octyl-silane and hexadecylsilane; a siloxane such as octamethyl-cyclo-tetrasiloxane and polydimethylsiloxane; a disilazane such as hexamethyl-disilazane; and a compound containing one or more alkylsiloxyl part(s), for example, a trimethylsiloxy part, which may be used either alone or in combination. These agents may be distributed over the surfaces of silica microparticles by reacting an active part such as halogen of the agents with a silanol group (SiOH) on surfaces of silica microparticles so as to be combined. As a result, it is thought that silica microparticles become hydrophobic.

A commercially available example of the hydrophobic silica (component B) is preferably Nipsil SS available from TOSOH SILICA CORPORATION of Tokyo, Japan.

The proportion of the hydrophobic silica (component B) is preferably 10 to 150 parts by weight (abbreviated to "parts", hereinafter) based on 100 parts of an ethylene-propylene copolymer (component A), particularly preferably 20 to 100 parts. When the proportion of the component B is less than 10 parts, the reinforcing effect tends to be poor and sufficient electrical resistance cannot be assured. When the proportion of the component B is over 150 parts, flexibility of the resulting hose tends to deteriorate.

Examples of the peroxide crosslinking agent (component C), which is used along with the component A and the component B, include peroxy ketals such as 1,1-bis(t-butylperoxy)-3,3,5-trimethyl cyclohexane, 1,1-bis(t-hexylperoxy)-3,3,5-trimethyl cyclohexane, 1,1-bis(t-hexylperoxy) cyclohexane, 1,1-bis(t-butylperoxy)cyclododecane, 1,1-bis(t-butylperoxy) cyclohexane, 2,2-bis(t-butylperoxy)octane, n-butyl-4,4-bis(t-butylperoxy)butane and n-butyl-4,4-bis(t-butylperoxy)valerate; dialkyl peroxides such as di-t-butylperoxide, dicumyl peroxide, t-butyl cumylperoxide, α, α'-bis(t-butylperoxy-m-isopropyl) benzene, α, α'-bis(t-butylperoxy)diisopropylbenzene, 2,5-dimetyl-2,5-di(t-butylperoxy)hexane and 2,5-dimetyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoylperoxide and m-toluoylperoxide; peroxy esters such as t-butylperoxy acetate, t-butylperoxy isobutylate, t-butylperoxy-2-ethylhexanoate, t-butylperoxylaurylate, t-butyl peroxybenzoate, di-t-butyl peroxyisophthalate, 2,5-dimethyl-2,5-di(benzoyl peroxy) hexane, t-butylperoxy maleic acid, t-butylperoxy isopropylcarbonate and cumylperoxyoctate; and hydro peroxides such as t-butylhydroperoxide, cumene hydroperoxide, diisopropylbenzene hydroperoxide, 2,5-dimethylhexane-2,5-dihydroperoxide and 1,1,3,3-tetramethylbutylperoxide, which may be used either alone or in combination. Among these peroxide crosslinking agents, 2,5-dimethyl-2,5-di(t-butylperoxy)hexane is particularly preferred, because it is free from problems associated with smell.

The peroxide crosslinking agent (component C) is preferably present in a proportion of 1.5 to 20 parts based on 100 parts of the ethylene-propylene copolymer (component A). If the proportion of the peroxide crosslinking agent is smaller than 1.5 parts, the resulting hose tends to have a low strength because of insufficient crosslinking. If the proportion of the peroxide crosslinking agent is greater than 20 parts, the resulting hose tends to have a poor flexibility with a high hardness.

The carbon black (component D), which is used along with the above-mentioned components A to C, is not specifically limited, but examples thereof include KETJEN BLACK (tradename; available from KETJEN BLACK INTERNATIONAL CORPORATION of Tokyo, Japan), acetylene black, furnace black, channel black, thermal black and color black, which may be used either alone or in combination, among which SRF carbon black (tradename; available from Tokai Carbon Co., Ltd. of Tokyo, Japan) is preferred.

The carbon black (component D) is preferably present in a proportion of 20 to 120 parts, particularly preferably 60 to 100 parts, based on 100 parts of the ethylene-propylene copolymer (component A). If the proportion of the carbon black is smaller than 20 parts, a reinforcing effect is poor and high-hardness of the resulting hose cannot be realized. If the proportion of the carbon black is greater than 120 parts, the resulting hose tends to have low electrical resistance, resulting in deterioration of electrical insulation.

The inventive hose material includes the above-mentioned components A to D, as essential components, and may also include one or more of a co-crosslinking agent, process oil, an anti-aging agent and the like, as required.

Preferable examples of the co-crosslinking agent include, for example, divinyl benzene and triallyl isocyanurate (TAIC). Further examples thereof include triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenyl benzene, p-quinonedioxime, p,p'-dibenzoyl quinonedioxime, phenyl maleimide, allyl methacrylate, N,N-m-phenylenebismaleimide, diallyl phthalate, tetraallyl oxyethane and 1,2-polybutadiene, which may be used either alone or in combination.

The co-crosslinking agent is preferably present in a proportion of 0.1 to 10 parts, particularly preferably 0.5 to 7.0 parts, based on 100 parts of the ethylene-propylene copolymer (component A).

The process oil is preferably present in a proportion of 5 to 100 parts, particularly preferably 20 to 80 parts, based on 100 parts of the ethylene-propylene copolymer (component A).

Examples of the anti-aging agent include, for example, a carbamate anti-aging agent, a phenylenediamine anti-aging agent, a phenol anti-aging agent, a diphenylamine anti-aging agent, a quinoline anti-aging agent and waxes, which may be used either alone or in combination.

The anti-aging agent is preferably present in a proportion of 0.2 to 2.0 parts, particularly preferably 0.5 to 1.0 parts, based on 100 parts of the ethylene-propylene copolymer (component A).

The inventive hose material for use in a fuel cell can be prepared by mixing the above-mentioned components A to D, and any of a co-crosslinking agent, a process oil, an anti-aging agent or the like as required and then kneading the resulting mixture by means of a kneading machine such as a kneader, a Banbury mixer or a roll mill.

The inventive hose for use in a fuel cell is produced, for example, by molding the hose material, as prepared in the above manner, into a hose shape and crosslinking the resulting hose entirely under prescribed conditions. When molding, a mandrel may be used, as required.

The thus produced hose may generally have a thickness of 1.5 to 12 mm and an internal diameter of 5 to 50 mm.

The structure of the hose is not limited to the aforesaid single-layer structure and the hose may have a multi-layer structure of two or more layers. In this case, an innermost layer of the inventive hose is preferably formed by using the inventive hose material for use in a fuel cell from the viewpoint of low extraction property and electrical insulation.

The inventive hose material for use in a fuel cell system is not limited to a material for use in such system, and, for example, is applicable to a hose for a stationary fuel cell system, a hose for transporting coolant in a computer, or parts (such as a packing or a separator) for constituting such system.

Next, an explanation will be given to Examples and Comparative Examples.

Prior to conducting the Examples and the Comparative Examples, the following materials were obtained.

EPDM (Component A)

ESPRENE 501A available from Sumitomo Chemical Co., Ltd., of Tokyo, Japan and having an iodine value of 12, an ethylene ratio of 50 wt % and a Mooney viscosity (ML1+4 100° C.) of 43

Hydrophobic Silica (Component B)

Nipsil SS-30P available from TOSOH SILICA CORPORATION

Normal Silica

Nipsil ER available from TOSOH SILICA CORPORATION

Silane Coupling Agent

A-174 available from Nippon Unicar Company Limited

Peroxide Crosslinking Agent (Component C)

2,5-dimethyl-2,5-di(t-butylperoxy)hexane (Perhexa 25B available from Nippon Kayaku Corporation of Tokyo, Japan)

Carbon Black (Component D)

Showblack IP-200 available from Showa Cabot K. K. of Tokyo, Japan

Process Oil

Diana Process PW-380 available from Idemitsu Kosan Co., Ltd. of Tokyo, Japan

Co-Crosslinking Agent

Ethylene glycol-dimethacrylate (Hi-cross ED available from Seiko Chemical Co., Ltd. of Tokyo, Japan)

Anti-Aging Agent 2,2,4-trimethyl-1,2-dihydroquinoline (TMDQ) (NON-FLEX RD available from Seiko Chemical Co., Ltd. of Tokyo, Japan)

EXAMPLES 1 to 4 and COMPARATIVE EXAMPLES 1 to 3

Each material was blended as shown in Tables 1 and 2, and then the resulting mixture was kneaded by means of a Banbury mixer and a roll mill for preparation of a hose material for use in a fuel cell.

Properties of the hose materials thus produced in accordance with the Examples and the Comparative Examples were evaluated in the following manners. The results of the evaluations are also shown in Tables 1 and 2.

Tensile Strength (TB) and Elongation (EB)

Each hose material was press-crosslinked at 160° C. for 45 minutes for preparation of a vulcanized rubber sheet having a thickness of 2 mm, and then stamped to provide a No. 5 dumbbell specimen in accordance with Japanese Industrial Standards (hereinafter referred to as JIS). The tensile strength (TB) and elongation (EB) of the specimen were determined in conformity with JIS K 6251. The larger the values of TB and EB are, the better such properties are.

Surface of Molded Products

Surface roughness of each molded product obtained by molding by means of Garvey die was visually evaluated. The results were indicated by symbols ○, Δ and X, which were decreasing smoothness in this order.

Volume Resistivity

The volume resistivity was determined in conformity with JIS K 6911 by using each hose material. The larger the value of the volume resistivity is, the better electrical insulation is.

Electrical Conductivity of Extracted Solution

The thus vulcanized rubber sheet was stamped into a specimen. The specimen was placed into a propylene container together with pure water (not more than 1.0 μS/cm) in such that a rate of pure water amount (ml)/surface area (cm$^2$) of the specimen is 2.80, and then the container was sealed. The specimen in such a state was subjected to heat treatment at 100° C. for 168 hours to obtain an extracted solution. The electrical conductivity of the thus obtained extracted solution was measured at 25° C. by means of electrical conductivity meter (Conductivity meter D-24 available from Horiba, Ltd., Kyoto of Japan). As a control, pure water was put into a propylene container, and the container was sealed, and then subjected to heat treatment under the same conditions. The electrical conductivity of the thus obtained solution was measured by the same method. As the electrical conductivity for the evaluation of low extraction property, the electrical conductivity of the control was deducted from that of the extracted solution. In Tables 1 and 2, the symbol ⊙ indicates that electrical conductivity was less than 3.0 μS/cm, the symbol ○ indicates that electrical conductivity was not less than 3.0 μS/cm and less than 4.0 μS/cm, the symbol Δ indicates that electrical conductivity was not less than 4.0 μS/cm and less than 6.0 μS/cm, and the symbol X indicates that electrical conductivity was not less than 6.0 μS/cm.

TABLE 1

(Parts by weight)

|  | EXAMPLE | | | |
| --- | --- | --- | --- | --- |
|  | 1 | 2 | 3 | 4 |
| EPDM (component A) | 100 | 100 | 100 | 100 |
| Hydrophobic silica (Component B) | 10 | 50 | 100 | 150 |
| Normal silica | — | — | — | — |
| Silane coupling agent | — | — | — | — |
| Peroxide crosslinking agent (component C) | 5 | 5 | 5 | 5 |
| Carbon black (component D) | 70 | 70 | 70 | 70 |
| Process oil | 50 | 50 | 50 | 50 |
| Co-crosslinking agent | 3 | 3 | 3 | 3 |
| Anti-aging agent | 0.5 | 0.5 | 0.5 | 0.5 |
| Tensile strength (MPa) | 8.7 | 11.5 | 12.5 | 13.0 |
| Elongation (%) | 300 | 270 | 250 | 200 |
| Molded surface | ○ | ○ | ○ | ○ |
| Volume resistivity (Ω · cm) | $1.0 \times 10^7$ | $5.0 \times 10^{10}$ | $1.0 \times 10^{12}$ | $5.0 \times 10^{13}$ |
| Electrical conductivity of extracted solution (μS/cm) | 2.5 | 2.7 | 3.1 | 3.5 |
| Low extraction property | ⊙ | ⊙ | ○ | ○ |

TABLE 2

(Parts by weight)

|  | COMPARATIVE EXAMPLE | | |
| --- | --- | --- | --- |
|  | 1 | 2 | 3 |
| EPDM (component A) | 100 | 100 | 100 |
| Hydrophobic silica (Component B) | — | — | — |
| Normal silica | 50 | 50 | — |
| Silane coupling agent | — | 2 | — |
| Peroxide crosslinking agent (component C) | 5 | 5 | 5 |
| Carbon black (component D) | 70 | 70 | 100 |
| Process oil | 50 | 50 | 50 |
| Co-crosslinking agent | 3 | 3 | 3 |
| Anti-aging agent | 0.5 | 0.5 | 0.5 |
| Tensile strength (MPa) | 11.0 | 11.0 | 12.0 |
| Elongation (%) | 400 | 200 | 250 |
| Molded surface | Δ | X | ○ |
| Volume resistivity (Ω · cm) | $1.0 \times 10^{10}$ | $1.0 \times 10^{10}$ | $1.0 \times 10^6$ |
| Electrical conductivity of extracted solution (μS/cm) | 16.8 | 3.9 | 4.3 |
| Low extraction property | X | ○ | Δ |

As can be understood from the results of the hose materials of the Examples shown in Table 1, each Example was superior in all properties such as electrical insulation, low extraction property and the like. Further, the inventors confirmed by experiments that the hose materials using EPM instead of EPDM of the Examples also were superior in all properties such as electrical insulation, low extraction property and the like as same as Examples using EPDM.

In contrast, since the hose material of Comparative Example 1 used normal silica instead of hydrophobic silica of Examples, low extraction property was deteriorated. Since the hose material of Comparative Example 2 used normal silica and silane coupling agent together, deterioration of low extraction property was prevented, however, bad effects appeared in terms of elongation and molded surface, which did not satisfy quality required by the present invention. Since the hose material of Comparative Example 3 was highly-filled with carbon black, a reinforcing effect could be assured, however, especially, bad effects imparted to electrical insulation was remarkable, which did not satisfy quality required for the present invention.

The inventive hose material for use in a fuel cell system is not limited to a material for use in such a system, and, for example, is applicable to a hose for a stationary fuel cell system, a hose for transporting coolant in a computer, or parts (such as a packing or a separator) for constituting such systems.

What is claimed is:

1. A fuel cell hose comprising at least one constituent layer including an innermost layer which is formed of a composition essentially consisting of: (A) an ethylene-propylene copolymer; (B) hydrophobic silica; (C) a peroxide crosslinking agent; and (D) carbon black, the composition containing no silane coupling agent.

2. A fuel cell hose as set forth in claim 1, wherein the hydrophobic silica is present in the composition forming the innermost layer in an amount of 10 to 150 parts by weight based on 100 parts by weight of the ethylene-propylene copolymer.

3. A fuel cell hose as set forth in claim 2, wherein the carbon black is present in the composition forming the innermost layer in an amount of 20 to 120 parts by weight based on 100 parts by weight of the ethylene-propylene copolymer.

4. A fuel cell hose as set forth in claim 1, wherein the carbon black is present in the composition forming the innermost layer in an amount of 20 to 120 parts by weight based on 100 parts by weight of the ethylene-propylene copolymer.

* * * * *